United States Patent
Kamoshida (10) Patent No.: US 7,986,394 B2
(45) Date of Patent: Jul. 26, 2011

(54) FLEXURAL LIQUID CRYSTAL PANEL AND LIQUID CRYSTAL DEVICE

(75) Inventor: Kenta Kamoshida, Kawasaki (JP)

(73) Assignee: InfoVision Optoelectronics Holdings Limited, Tortola (VG)

( * ) Notice: Subject to any disclaimer, the term of this patent is extended or adjusted under 35 U.S.C. 154(b) by 682 days.

(21) Appl. No.: 12/001,401

(22) Filed: Dec. 11, 2007

(65) Prior Publication Data
US 2008/0137013 A1 Jun. 12, 2008

(30) Foreign Application Priority Data

Dec. 11, 2006 (JP) .................................. 2006-333625

(51) Int. Cl.
*G02F 1/1333* (2006.01)
(52) U.S. Cl. ....................................... 349/158; 349/110
(58) Field of Classification Search .......... 349/158–160, 349/110, 139
See application file for complete search history.

(56) References Cited

U.S. PATENT DOCUMENTS

| | | | |
|---|---|---|---|
| 5,710,607 A * | 1/1998 | Iwamoto et al. | 349/60 |
| 6,262,787 B1 * | 7/2001 | Kamoi et al. | 349/96 |
| 6,654,071 B2 * | 11/2003 | Chen | 349/12 |
| 7,190,503 B2 * | 3/2007 | Ide | 359/245 |
| 7,705,959 B2 * | 4/2010 | Kim et al. | 349/158 |

* cited by examiner

*Primary Examiner* — Dung T. Nguyen
(74) *Attorney, Agent, or Firm* — Connolly Bove Lodge & Hutz LLP (57) ABSTRACT

The object of the invention is to provide a liquid crystal display device having a flexural panel formed by bending the normal plan liquid crystal panel, which possesses an excellent display quality without the leakage of the light. The technical solution thereof is: the entire liquid crystal panel is bent to form a concave shape bend at the observer's side of the liquid crystal panel, that is, at a side of the CF substrate, towards the observer, so that the pitch at the horizontal direction of the respective pixels on the CF substrate is shorter than the pitch at the horizontal direction of the respective pixels on the TFT substrate, or to make said the same as each other and the width at the horizontal direction of the black matrix existing in both left and right end regions of the horizontal direction on the CF substrate, which is bent to a concave shape, is greater than the width at the horizontal direction of the black matrix disposing in the central section region.

14 Claims, 9 Drawing Sheets

FLEXURAL LIQUID CRYSTAL PANEL AND LIQUID CRYSTAL DEVICE

FOREIGN PRIORITY

This application claims foreign priority from Japanese Application No. 2006-333625 filed Dec. 11, 2006, the content thereof is incorporated by reference in its entirety.

TECHNICAL FIELD

The invention relates to an active matrix type liquid crystal panel and an active matrix type liquid crystal display device.

BACKGROUND ART

Recently, that the picture of the liquid crystal display device changes to large picture has been speeded up as the liquid crystal display device is used as the display device of the television set. While the picture has been developed to large picture, the viewer has discovered that a problem exists, in which the visual angle difference existing between the visual angle for viewing the central part of the picture and the visual angle for viewing the right and left ends of the picture (the term "visual angle" is defined as an angle formed by the visual line of the observer who views the picture and the tangent of the picture, and the difference value is defined as the "visual angle difference") will be greater.

In order to solve the problem of the visual angle difference, that the shape of the flexural panel is formed in a concave shape at a side near the observer is taken into consideration.

The liquid crystal panel is formed by two glass sheet having the liquid crystal sandwiched between them, therefore, by setting the position of the observer's eye as a center, if two glass sheet are bent in a concave shape at the observer's side, then a tender difference exists between the width of the glass substrate near the observer's side, that is, at the inner side, and the width of the glass substrate at the far end, that is, at the outer side, the width of the glass in a transverse direction at the outer side will be wider. This will be described with reference to the following drawings.

Figure 10:
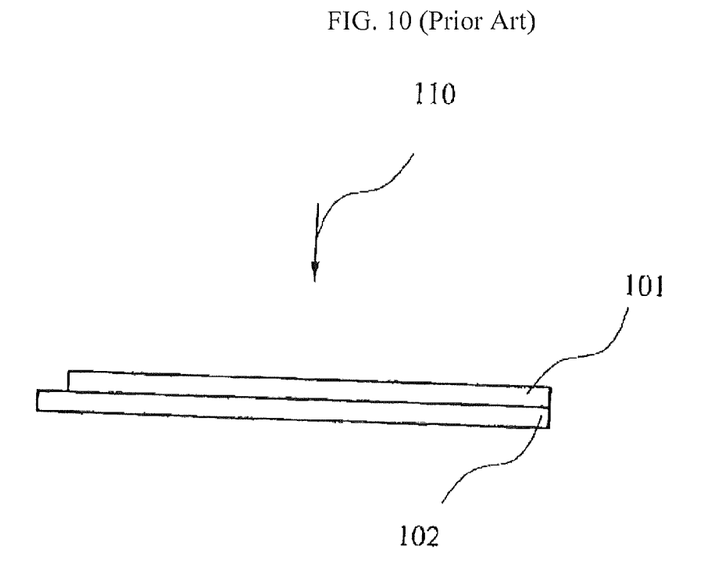
FIG. 10 is a view of the glass substrates in which the outline of the two sheets of the substrates before bending is viewed from an end direction of the substrate.

FIG. 10 is a simplified cross sectional view of the glass substrates before two sheets of the substrates being bent.

Figure 11:
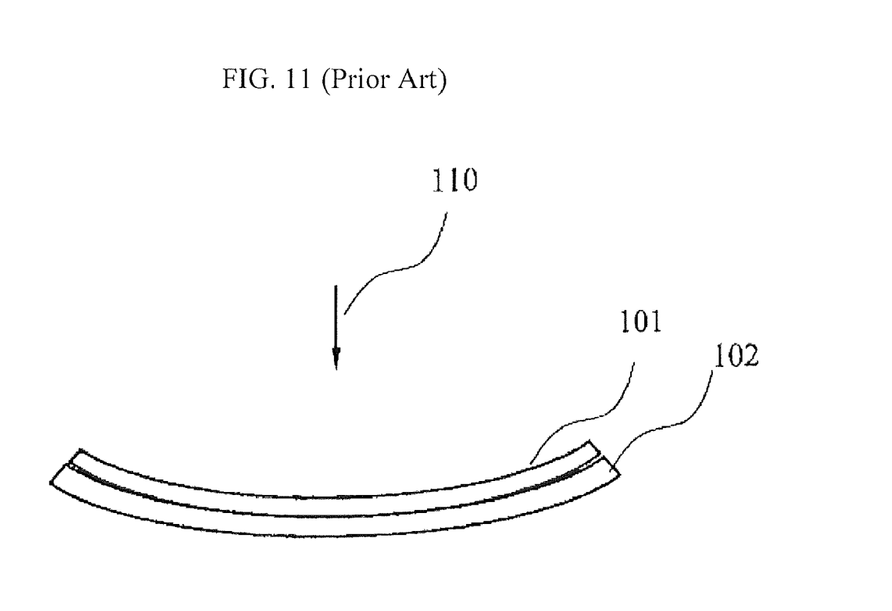
FIG. 11 is a simplified cross sectional view of the two sheets of the substrates in FIG. 10 after bending.

FIG. 11 is a simplified cross sectional view of the glass substrate after two sheets of the substrates being bent. In FIG. 10 and FIG. 11, 101 is a CF (Color Filter) substrate of the two sheets of the substrates which is the nearest one to the observer, 102 is a TFT (Thin Film Transistor) substrate which is the farthest one to the observer, and 110 is an arrow indicating the sight line of the observer.

As shown in FIG. 10 and FIG. 11, in order to superpose precisely two sheets of the bent substrates, it is required that the width of the outer substrate must be larger than the transverse width of the inner substrate.

Furthermore, it is a problem of the flexural panel that the light of the back-lighting will leak from the black matrix of the color filter. This will be described according to the drawings as follows.

Figure 1:
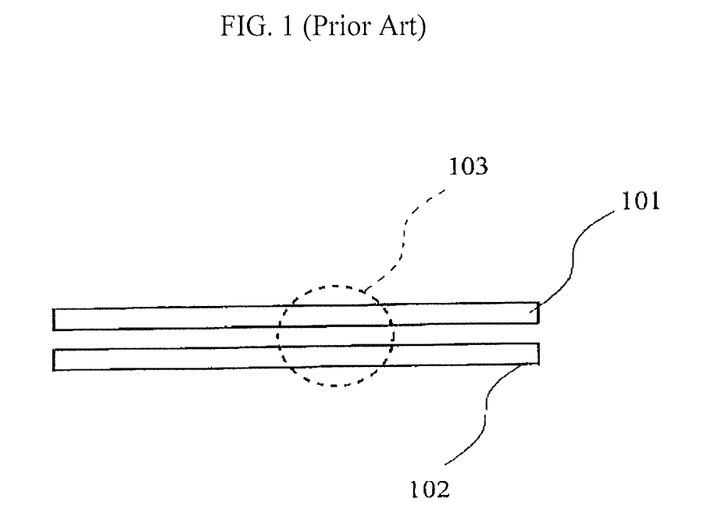
FIG. 1 is a cross sectional view of a plan liquid crystal panel.

FIG. 1 is a cross sectional view of a plan liquid crystal panel.

Figure 2:
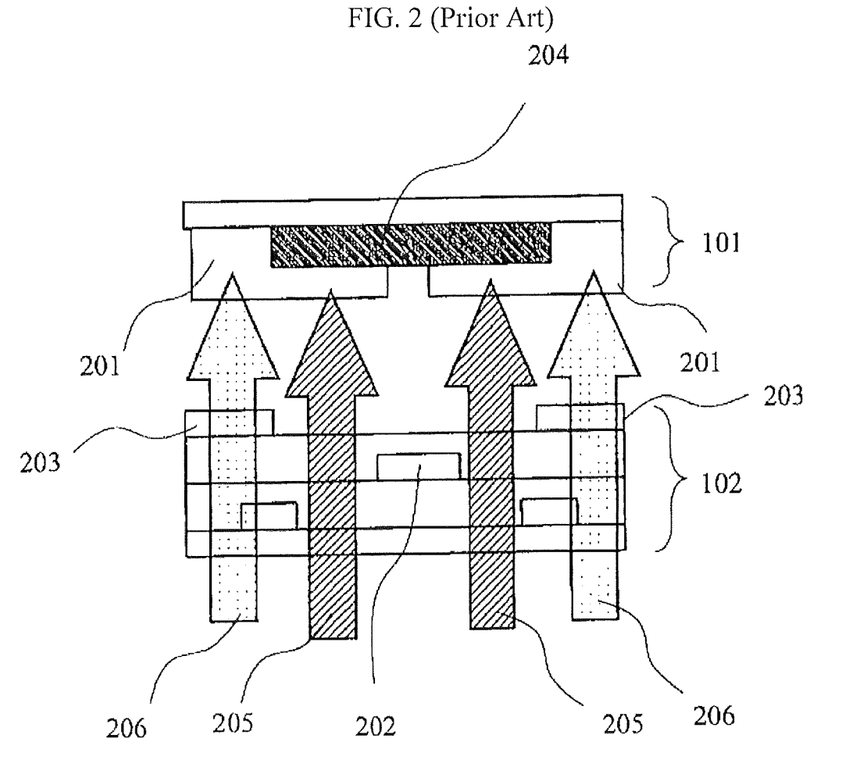
FIG. 2 is an enlarged cross sectional of a portion 103 in FIG. 1.

FIG. 2 is an enlarged cross sectional view of a portion 103 in FIG. 1.

In FIG. 2, 204 is a black matrix (Hereinafter also referred to as "BM"), 201 is a pigmentation section of the color filter, 202 is a signal line, 205 is a light of the back-lighting transmitted to BM 204, 206 is a light of the back-lighting transmitted to the pigmentation section 201, 203 is ITO (Indium Tin Oxide) of the pixel. The light cannot pass through BM 204 so that BM 204 may block the light 205, and it cannot reach the eyes of the observer. As a result, the signal line 202 can be hidden at the back of BM 204 and cannot be seen by the eyes of the observer. Furthermore, because ITO 203 is transparent, the light 206 is transformed into color light after passing through the pigmentation section 201, and then reaches the eyes of the observer, and the observer can view a correct image.

Nevertheless, if the plan panel is bent, then the light 205 which must be blocked originally by BM 204 can pass through the pigmentation section 201 adjacent to BM 204, and can be viewed by the observer. This will be described according to the drawings as follows.

Figure 3:
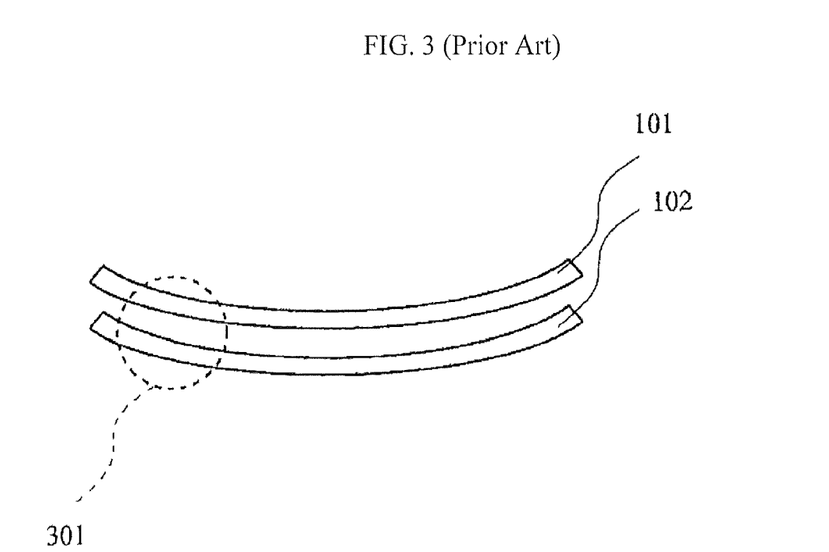
FIG. 3 is a cross sectional view of a substrate formed after bending the two sheets of the plan substrates in FIG. 1.
Figure 4:
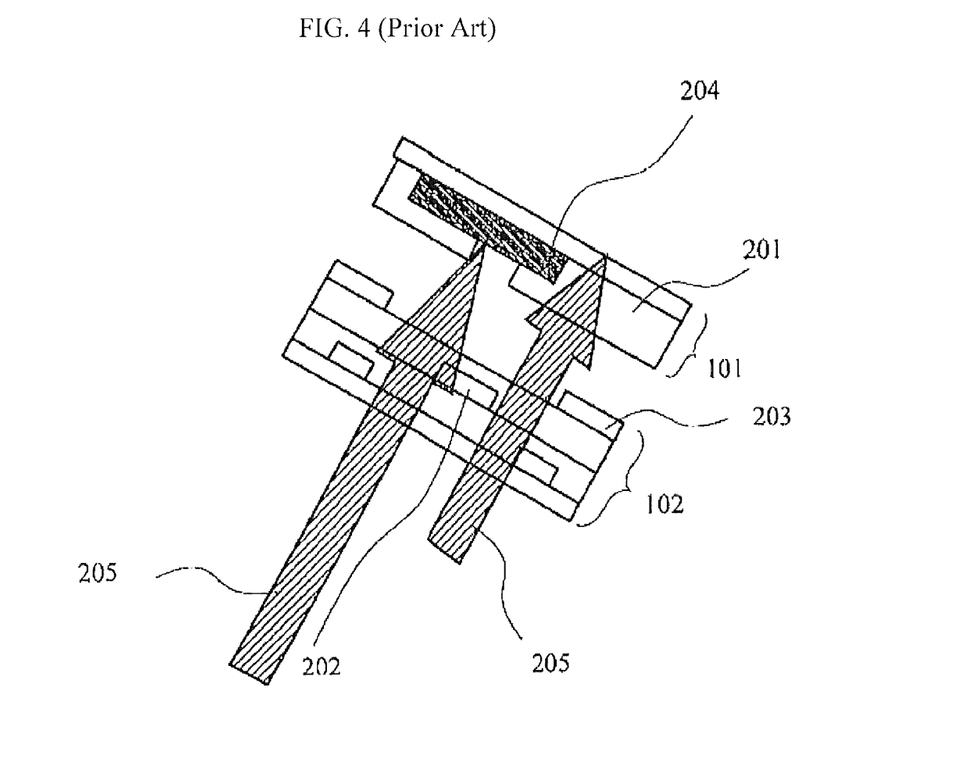
FIG. 4 is an enlarged cross sectional view of a portion 301 in FIG. 3.

FIG. 3 is a cross sectional view of a substrate which is a substrate of two sheets of plan substrates shown in FIG. 1 after bending. FIG. 4 is an enlarged sectional view of the section 301 shown in FIG. 3. The light 205 of FIG. 4 is a light which is blocked actually by BM 204, however, the panel is bent so that the position of BM 204 is slightly different from that of the liquid crystal panel in a plan shape, therefore the light leaks from the adjacent pigmentation section 201.

Therefore, the problem of the leakage of the light needs to be solved in order to provide a liquid crystal display device having flexural panel with excellent display quality.

Further, to be precise, the CF substrate and TFT substrate in FIG. 4 are flexural rather than in the plan shape, however, it is an enlarged view so that the flexuosity is very small and it can be described as a plane.

The reference, Japanese Utility Publication No. JP58-52513, is incorporated by reference in its entirety.

CONTENTS OF THE INVENTION

Herein, the object of the invention is to provide a liquid crystal display device having flexural panel, which is formed by bending the normal plan liquid crystal panel, and it is a liquid crystal display device having flexural panel with an excellent display quality that no any light leaks out.

The liquid crystal panel according to the first aspect of the invention is formed by sandwiching the liquid crystal between a TFT substrate and a CF substrate, said TFT substrate has the pixels containing the thin film transistors disposed in a matrix shape, and said CF substrate has color filter, wherein:

said entire liquid crystal panel is bent so that one side of the liquid crystal which facing the observer presents a concave shape, in said thin film transistor substrate and the color filter substrate, the length at the horizontal direction of the effective display region on the substrate, which is located near the observer's side, is shorter than the length at the horizontal direction of the effective display region on the substrate, which is located far from the observer's side.

When the two sheets of the substrates are bent, the leakage of the light can be prevented from occurring by adjusting the difference between the arc length of the inner substrate and the arc length of the outer substrate.

A liquid crystal panel according to the second aspect is a liquid crystal panel according to the first aspect, wherein said substrate, which is located near the observer's side, is the color filter substrate; said substrate, which is located far from the observer's side, is the thin film transistor substrate.

A liquid crystal panel according to the third aspect is a liquid crystal panel according to the second aspect, wherein the pitch at a horizontal direction between the respective pixels on said CF substrate is smaller than the pitch at a horizontal direction between the respective pixels on said TFT substrate.

For the difference of the arc length between the inner substrate and the outer substrate under the condition that the two sheets of the substrates are bent, the light leakage caused by the position offset of the black matrix of the color filter can be prevented from occurring by adjusting the pitch of the respective pixels.

A liquid crystal panel according to the fourth aspect is formed by sandwiching the liquid crystal between the TFT substrate having the pixels containing the thin film transistors disposed in a matrix shape and the CF substrate having the color filter, wherein:

said entire liquid crystal panel is bent so that one side of the liquid crystal which facing the observer presents a concave shape, in said thin film transistor substrate and the color filter substrate, the width at the horizontal direction of a black matrix existing in both left and right end regions at the horizontal direction of the substrate, which is located near the observer's side, is wider than the width of a black matrix on the center section region of the same substrate.

A liquid crystal panel according to the fifth aspect is a liquid crystal panel according to the fourth aspect, wherein said substrate, which is located near the observer's side, is a color filter substrate.

A liquid crystal panel according to the sixth aspect is a liquid crystal panel according to the fourth aspect, wherein the pitch at a horizontal direction between the respective pixels on said CF substrate is equal to the pitch at a horizontal direction between the respective pixels on said TFT substrate.

The width at the horizontal direction of the black matrix is changed to allow the pitch of the pixels on the CF substrate to be equal to the pitch of the pixels on the TFT substrate thereby the same liquid crystal panel can be used commonly for the plan liquid crystal panel and the flexural liquid crystal panel.

A liquid crystal panel according to the seventh aspect is a liquid crystal panel according to the fifth aspect, wherein the pitch at a horizontal direction between the respective pixels on said color filter substrate is smaller than or equal to the pitch at a horizontal direction between the respective pixels on said thin film transistor substrate.

A liquid crystal display device according to the eighth aspect, wherein it comprises the liquid crystal panel as described at any aspect of the above first~seventh aspects.

If the invention is employed, then a flexural panel display device, which is constructed by bending a normal plan liquid crystal panel, will be provided, and a flexural liquid crystal panel display device is formed by bending the plan liquid crystal panel so as to prevent the light of the back lighting from leaking, and having an excellent display quality.

EXPLANATION OF THE SYMBOLS

101: CF substrate
102: TFT substrate
201: pigmentation section of color filter
202: signal line
204: black matrix
K: light

MODE OF CARRYING OUT THE INVENTION

The embodiments of the invention will be described with reference to the drawings as follows.

A flexural liquid crystal panel according to the Embodiment I of the invention, in the two sheets of the substrates forming the liquid crystal panel, the pitch at the left-to-right direction of the respective pixels on the substrate which is located near the observer's side, that is, the CF substrate, is shorter than the pitch of the respective pixels on the substrate which is located far from the observer's side. It will be described with reference to the drawings as follows.

Figure 7:
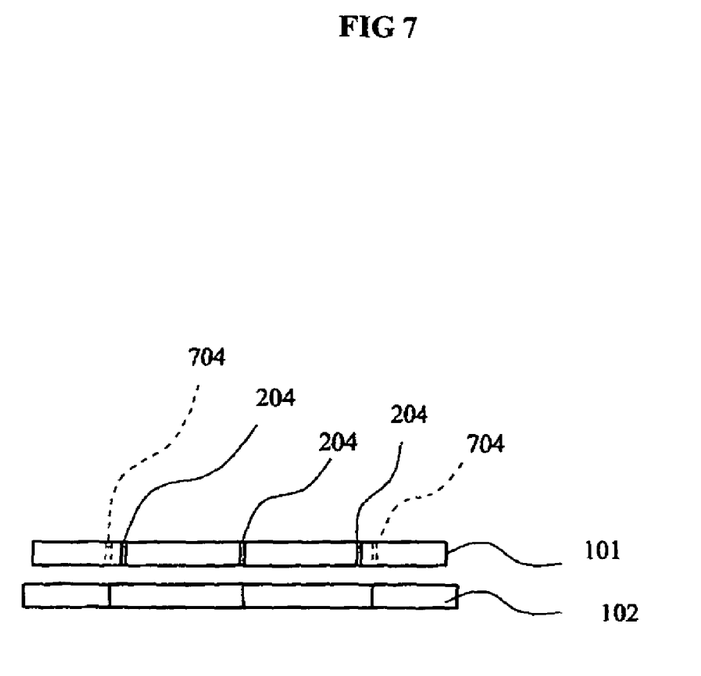
FIG. 7 is a cross sectional view of the CF substrate and TFT substrate in the plan shape before forming the flexural shape, and characterized in that the pitch at the left to right direction of the pixels on the CF substrate is shorter than the pitch of the pixels on the TFT substrate.

FIG. 7 is a cross sectional view of the CF substrate and TFT substrate in the plan shape before forming the flexural shape, and characterized in that the pitch at the left-to-right direction of the pixels on the CF substrate is shorter than the pitch of the pixels on the TFT substrate.

In FIG. 7, 101 is a CF substrate, 102 is a TFT substrate, 204 is a BM, 704 is the position of BM when the pitch of the respective pixels on the CF substrate and the pitch of the respective pixels on the TFT substrate are assumed to be the same. In the flexural liquid crystal panel according to the Embodiment 1 of the invention, the pitch at the left to right direction of the respective pixels on the CF substrate is formed to be shorter than the pitch of the respective pixels on the TFT substrate. As a result, the BM existing near both left and right ends on the CF substrate is located slightly adjacent to the center, as shown in FIG. 7.

In order to manufacture a substrate on which the pitch at the left to right direction of the pixels on the CF substrate near the observer's side is shorter than the pitch of the pixels on the TFT substrate located far from the observer's side, the photo mask having different pixel pitch is not used for the CF substrate and the TFT substrate, rather, the photo mask having the same pitch is used, when the process, such as the exposal process, and the like, is performed, if the exposal on the CF substrate and TFT substrate is performed by changing the magnification, then the photo mask which is the same as the photo mask used in the prior art can be used to manufacture the flexural liquid crystal panel of the Embodiment 1.

A bend method for bending a plan panel in order to form a concave shape at the observer's side will be described as follows. In order to bend the panel, the liquid crystal panel is fixed by the spacer which are formed in a flexural shape, for example, at two sides at a horizontal direction viewed by the observer of the liquid crystal among four sides around the plan shape panel, meanwhile, the liquid crystal panel is assembled into the liquid crystal display device thereby the plan shape panel is bent. It will be described according to the drawings as follows.

Figure 12:
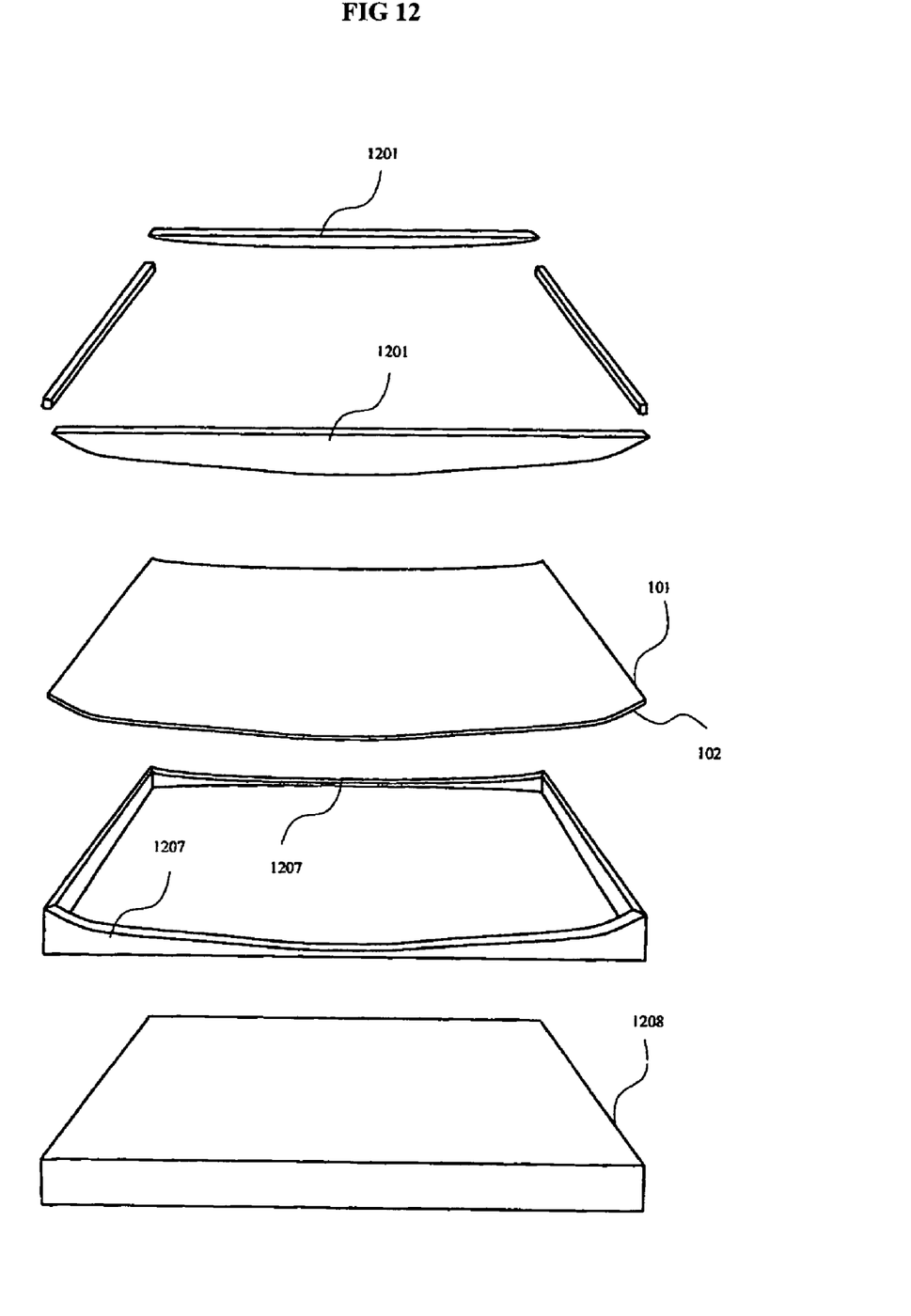
FIG. 12 is a deploying perspective view indicating a liquid crystal panel manufacturing method in which the pitch are disposed to change a plan shape liquid crystal panel to a flexural shape liquid crystal panel.

FIG. 12 is a deploying perspective view of the respective components indicating a liquid crystal panel manufacturing method in which the spacers are disposed to change a plan shape liquid crystal panel to a flexural shape liquid crystal panel.

In FIG. 12, 1201 is a spacer having convex shape, 1207 is a spacer having flexural shape in concave shape, 101 is a CF substrate, 102 is a TFT substrate, and 1208 is a back lighting unit.

By using the spacers 1207 and 1201 to hold the CF substrate and the TFT substrate, because the CF substrate and the TFT substrate are very thin, so they turn into a flexural shape by bending them simply. However, the manufacturing method in FIG. 12 is only an example.

Figure 8:
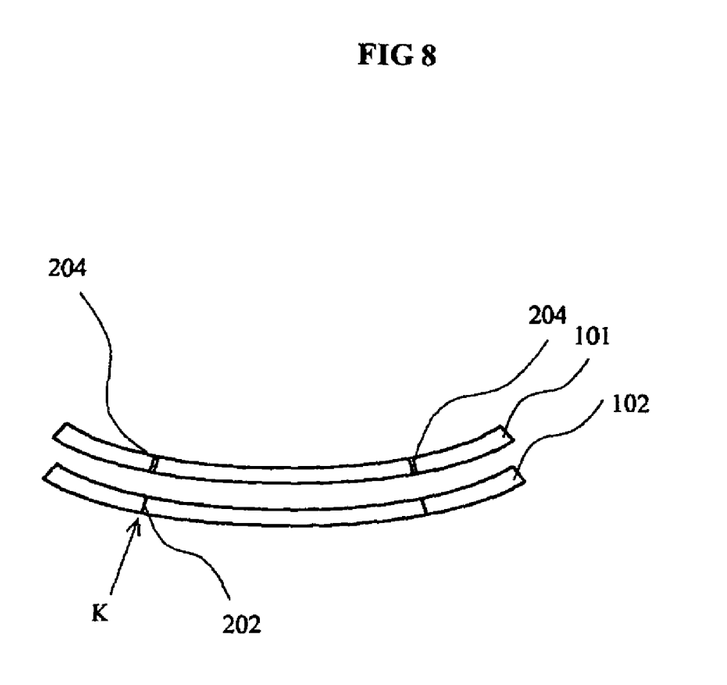
FIG. 8 is a cross sectional view of the panel in FIG. 7 after bending.

FIG. 8 is a cross sectional view of the liquid crystal panel according to the Embodiment 1 of the invention after the shape of the panel turning to a flexural shape.

In FIG. 8, 204 is a BM, 101 is a CF substrate, and 103 is a TFT substrate.

The pitch at the horizontal direction of the respective pixels on the CF substrate is shorter than the pitch at the horizontal direction of the respective pixels on the TFT substrate. As a result, the length of the side at the horizontal direction of the CF substrate is shorter than the length of the side at the horizontal direction of the TFT substrate.

The result of the flexural liquid crystal panel according to the Embodiment 1 of the invention as shown in FIG. 8 will be described as follows.

The result above can be understood easily by comparing the result of the flexural liquid crystal panel according to the embodiment of the invention and the problem occurring if the present invention is not employed. Therefore, the problem existing under the condition that the pitch at the left to right direction of the respective pixels on the CF substrate and the pitch at the left to right direction of the respective pixels on the TFT substrate are the same will be described firstly.

Figure 5:
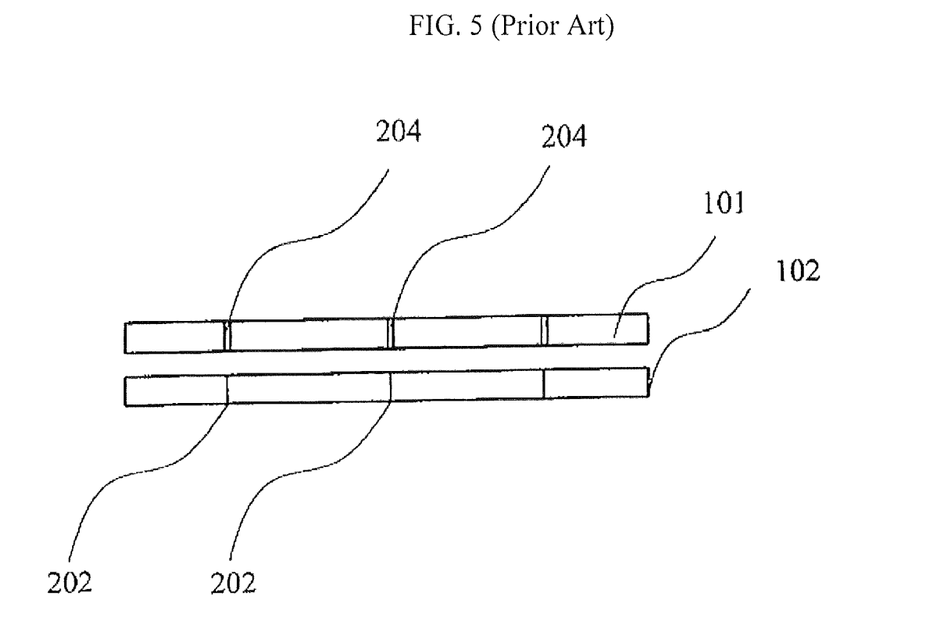
FIG. 5 is a cross sectional view showing a state before bending the CF substrate and TFT substrate when the pitch at the horizontal direction of the respective pixels on the CF substrate and the pitch at the horizontal direction of the respective pixels on the TFT substrate are the same, and the side lengths at the horizontal direction of the CF substrate and the TFT substrate are the same.

FIG. 5 is a cross sectional view indicating the relative position relation between the position of BM 204 and the signal line 202 when the pitch at the horizontal direction of the respective pixels on the CF substrate and the pitch at the horizontal direction of the respective pixels on the TFT substrate are the same.

Figure 6:
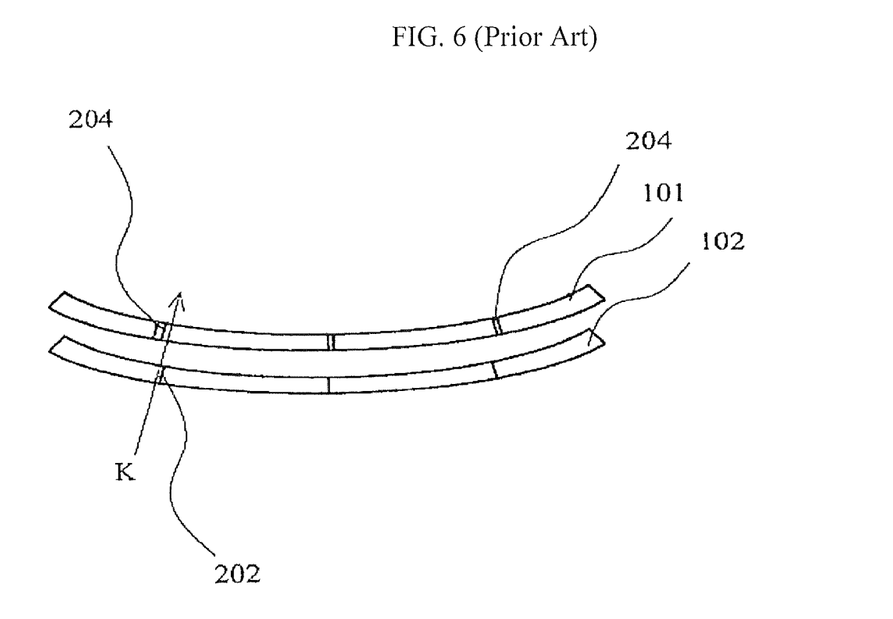
FIG. 6 is a cross sectional view after the substrates shown in FIG. 5 being bent.

FIG. 6 is a cross sectional view showing the substrates shown in FIG. 5 being bent.

In FIG. 6, K is the light from the back lighting. If the pitch at the horizontal direction of the respective pixels on the CF substrate and the pitch at the horizontal direction of the respective pixels on the TFT substrate are the same, then the light K, which can be masked originally by BM 204, will leak as shown in FIG. 6. Further, the signal line 202 cannot be hidden behind the BM.

The above problem is shown in FIG. 7 under a condition of the flexural liquid crystal panel of the Embodiment 1 of the invention, because in the flexural liquid crystal panel of the Embodiment 1 of the invention, the pitch of the pixels on the CF substrate is shorter than the pitch of the pixels on the TFT substrate, from the view point of an observer of the CF substrate, the BM existing adjacent to both left and right ends offsets slightly to the center, so the light K in FIG. 8 is masked by BM 204, and the light does not leak out. Furthermore, the signal line 202 can be hidden behind BM 204, as a result, an excellent display quality can be obtained.

Next, a flexural liquid crystal panel of the Embodiment 2 of the invention will be described.

A substrate structure is formed in which the observer's side of the flexural liquid crystal panel, that is the CF substrate side, of the Embodiment 2 is bent to a concave shape to allow the pitch of the pixels on the CF substrate to be the same as the pitch of the pixels on the TFT substrate, however, the width at the left to right direction of the black matrix existing in both the left and right end regions of the CF substrate bending in a concave shape is wider than the width at the left-to-right direction of the black matrix disposed in the central section region.

Figure 15:
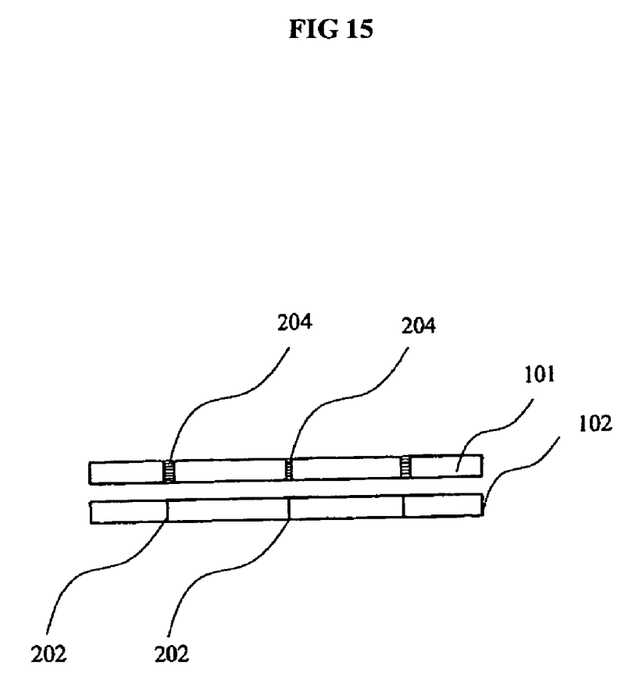
FIG. 15 is a cross sectional view of a substrate of the liquid crystal panel substrate before it is bent according to an embodiment of the invention.

FIG. 15 is a cross sectional view of a substrate of the liquid crystal panel substrate before it is bent according the Embodiment 2 of the invention.

In FIG. 15, 101 is a CF substrate, 102 is a TFT substrate, and 204 is BM. As shown in FIG. 15, in the flexural liquid crystal panel of the Embodiment 2 of the invention, the width of the BM existing near both left and right ends of the CF substrate is wider than the width of the BM existing in the center. The shape formed after bending the substrate will be described as follows.

Further, because the method for bending a plan panel to a shape presented a concave shape at the observer's side is the same as the method of the Embodiment 1, therefore the description thereof is omitted herein.

Figure 16:
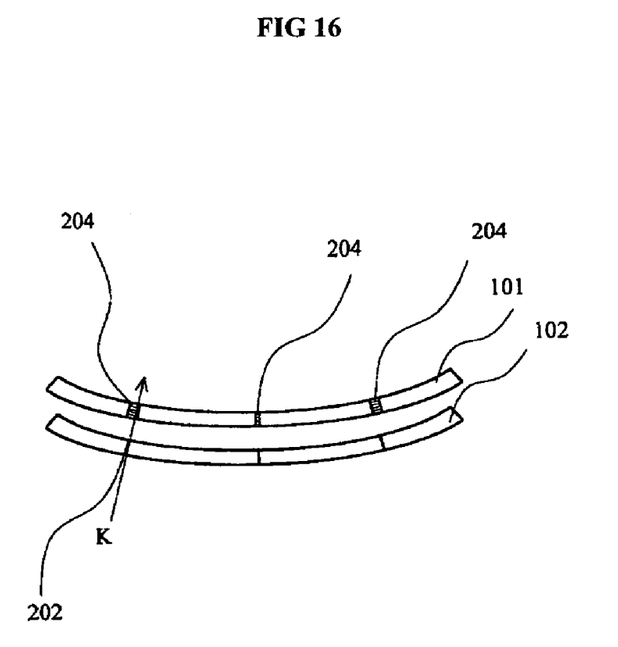
FIG. 16 is a cross sectional view of a liquid crystal panel having a flexural shape after bending the panel in FIG. 15.

FIG. 16 is a cross sectional view of a liquid crystal panel having a flexural shape after bending the panel in FIG. 15.

In FIG. 16, 204 is BM, 101 is a CF substrate, and 102 is a TFT substrate.

The result of the flexural liquid crystal panel of the Embodiment 2 in the invention will be described by referring to FIG. 16 as follows.

Before describing the effects, the problem caused in a condition in which the invention is not used will be described, that is, in such condition, the width of BM existing near both left and right ends of the CF substrate and the width of BM existing in the center are the same.

Figure 13:
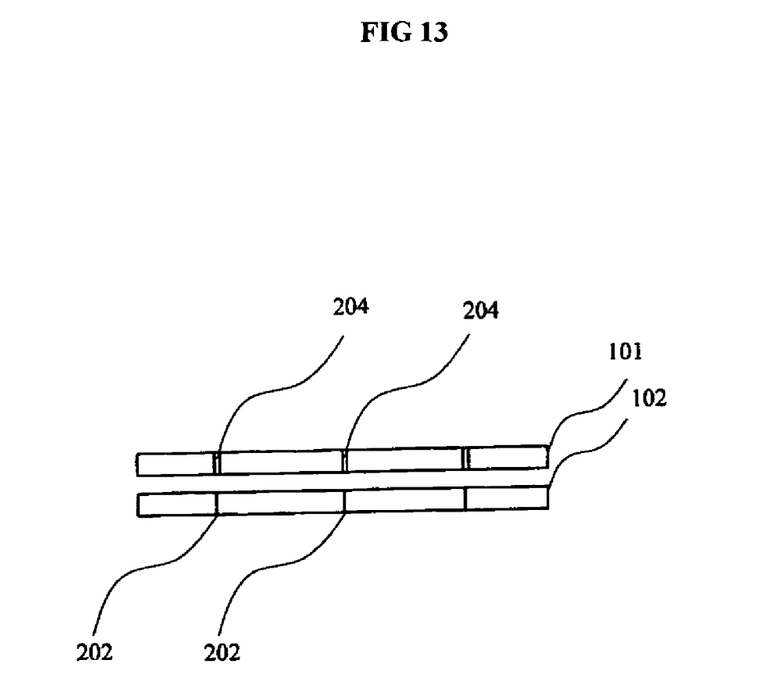
FIG. 13 is a cross sectional view of a substrate under a condition that the width of BM existing near both the left and right ends of the CF substrate and the width of BM existing in the center are the same.

FIG. 13 is a cross sectional view of a substrate under a condition that the width of BM existing near both the left and right ends of the CF substrate and the width of BM existing in the center are the same.

Figure 14:
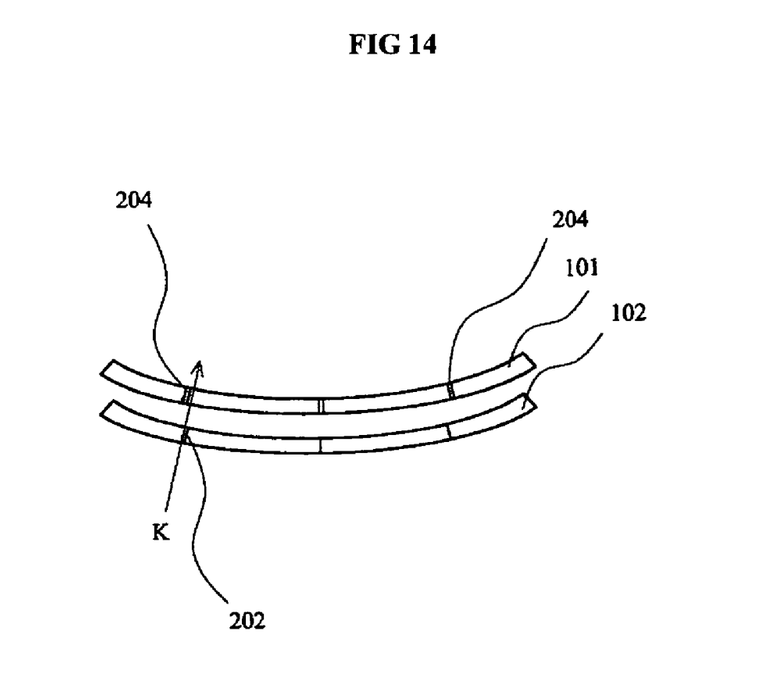
FIG. 14 is a cross sectional view of a liquid crystal panel, the flexural shape of which is formed by bending the panel in FIG. 13.

FIG. 14 is a cross sectional view of a liquid crystal panel having a flexural shape when the panel in FIG. 15 is bent.

In FIG. 14, K is the light coming from the back lighting. As shown in FIG. 14, if the width of BM existing near both the left and right ends of the CF substrate and the width of BM existing in the center are the same, then the light K which can be masked originally by BM 204 will leak out. Further, the signal line 202 cannot be hidden behind BM.

On the other hand, under the condition of the flexural liquid crystal panel of the Embodiment 2 of the invention, as shown in FIG. 16, the width of BM existing near both the left and right ends of the CF substrate is wider than the width of BM existing in the center. As a result, the light K is masked by BM 204, therefore, the light does not leak out. Further, the signal line 202 can hide behind BM 204. As a result, an excellent display quality can be obtained.

Further, another effect of the flexural liquid crystal panel of the Embodiment 2 of the invention is: for the flexural liquid crystal panel of the Embodiment 2, the leakage of the light can be prevented not only under the condition that the panel is bent, but also under the condition that it is a plan panel. That is, the liquid crystal panel of the Embodiment 2 of the invention can be used for both plan liquid crystal panel and flexural liquid crystal panel.

Further, for the flexural liquid crystal panel of the Embodiment 2 of the invention, except that it has a characteristic that the width at the left-to-right direction of the black matrix existing in both left and right end regions of the CF substrate having a concave shape bend is wider than the width at the left to right direction of the black matrix disposing in the central section region, it also has another characteristic that the pitch of the pixels on the CF substrate and the pitch of the pixels on the TFT substrate are the same; however, as another embodiment of the invention, it has a characteristic that the width at the horizontal direction (left to right direction) of the black matrix existing in both left and right end regions of the CF substrate having a concave shape bend is wider than the width at the left to right direction of the black matrix disposing in the central section region, and also comprises a characteristic that the pitch at the horizontal direction (left-to-right direction) of the pixels on the CF substrate is smaller than the pitch at the horizontal direction (left-to-right direction) of the pixels on the TFT substrate. The flexural liquid crystal panel of said embodiment can also prevent the light from leaking.

The structure of the liquid crystal panel of said embodiment synthesizes the features of the Embodiment 1 and Embodiment 2, the specific description is omitted herein and so is the method for bending the plan liquid crystal panel.

Finally, as a reference, the result of the calculation will be presented as an example under a condition that the substrate is bent and the lengths of the CF substrate and TFT substrate are different, and a 47 inches TV is used as a panel. However, this is only one of the numerical examples.

As the premise condition of the example, as for the sizes of the panel, the transverse length is 1042 mm, the longitudinal length is 586 mm, the gap between the CF substrate and TFT substrate is 5 μm, and the distance between the position of the observer's eyes and the panel is 1650 mm.

Figure 9:
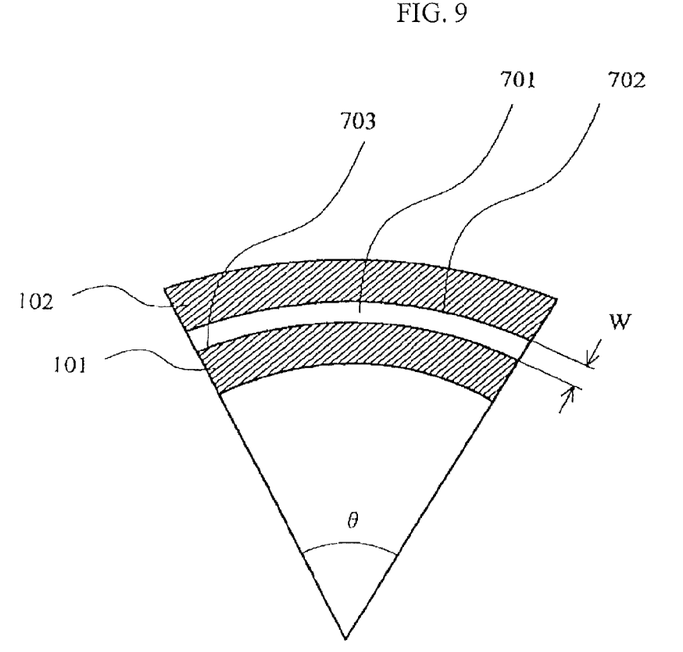
FIG. 9 is a view used for describing a calculation method.

FIG. 9 is a view used for describing a calculation method of the example.

In FIG. 9, 101 is a CF substrate, 102 is a TFT substrate, 701 is a gap for sandwiching the liquid crystal, W is the length of the gap 701, 702 is an arc at the outer side of the gap 701, θ is an angle between a line connecting the eyes of the observer with the left end of the TV panel and a line connecting the eyes of the observer with the right end of the TV panel.

Furthermore, W is 5 μm. Further, for the cross section of CF substrate 101 and TFT substrate 102, under the condition that the plan substrate is bent, it is considered that the cross sectional view is not a simple shape as shown in FIG. 9 because of the internal stress of the substrates. However, the purpose of FIG. 9 is to describe a formula for calculating the difference between the arc 701 and the arc 702, therefore it is not correct, but only for the convenience for describing.

θ can be calculated with the following formula (1).
[Formula 1]

$$\theta = 1042 \div (2\pi \times 1650) \times 360° = 36.1842°  \quad (1)$$

Furthermore, if Δ is used to express the difference between the arc 702 and the arc 703, then the difference Δ of about 3 μm can be obtained with the following formula (2).
[Formula 2]

$$\Delta = 2\pi \times (1650 + 0.005) \times \theta \div 360° - 1042 \quad (2)$$

What is claimed is:

1. A liquid crystal panel, which is formed by sandwiching the liquid crystal between a thin film transistor substrate and a color filter substrate, said thin film transistor substrate has the pixels containing thin film transistors in a matrix shape, and said color filter substrate has color filter, wherein:
   said entire liquid crystal panel is bent so that one side of the liquid crystal which facing the observer presents a concave shape,
   in said thin film transistor substrate and the color filter substrate, the length at the horizontal direction of the effective display region on the substrate, which is located near the observer's side, is shorter than the length at the horizontal direction of the effective display region on the substrate, which is located far from the observer's side.

2. The liquid crystal panel as claimed in claim 1, wherein said substrate, which is located near the observer's side, is the color filter substrate; said substrate, which is located far from the observer's side, is the thin film transistor substrate.

3. The liquid crystal panel as claimed in claim 2, wherein the pitch at a horizontal direction of the respective pixels on said color filter substrate is smaller than the pitch at a horizontal direction of the respective pixels on said thin film transistor substrate.

4. The liquid crystal panel as claimed in claim 3, wherein a black matrix is disposed on said color filter substrate, said black matrix is used for masking the signal lines disposed on the thin film transistor substrate, comparing with the signal lines on the corresponding thin film transistor substrate, the black matrix existing in two end regions at the horizontal direction of the color filter substrate is closer to the center.

5. A liquid crystal display device having the liquid crystal panel as claimed in claim 1.

6. The liquid crystal display device as claimed in claim 5, wherein said substrate, which is located near the observer's side, is a color filter substrate.

7. The liquid crystal display device as claimed in claim 6, wherein the pitch at a horizontal direction of the respective pixels on said color filter substrate is smaller than the pitch at a horizontal direction of the respective pixels on said thin film transistor substrate.

8. The liquid crystal display device as claimed in claim 7, wherein a black matrix is disposed on said color filter substrate, said black matrix is used for masking the signal lines disposed on the thin film transistor substrate, comparing with the signal lines on the corresponding thin film transistor substrate, the black matrix existing in two end regions at the horizontal direction of the color filter substrate is closer to the center.

9. A liquid crystal panel, which is formed by sandwiching the liquid crystal between a thin film transistor substrate and a color filter substrate, said thin film transistor substrate has pixels containing the thin film transistors in a matrix shape, and said color filter substrate has color filter, wherein:

said entire liquid crystal panel is bent so that one side of the liquid crystal which facing the observer presents a concave shape, in said thin film transistor substrate and the color filter substrate, the width at the horizontal direction of a black matrix existing in both left and right end regions at the horizontal direction of the substrate, which is located near the observer's side, is wider than the width of the black matrix on the center section region of the same substrate.

10. The liquid crystal panel as claimed in claim 9, wherein said substrate, which is located near the observer's side, is a color filter substrate.

11. The liquid crystal panel as claimed in claim 9, wherein the pitch at a horizontal direction between the respective pixels on said color filter substrate is smaller than or equal to the pitch at a horizontal direction between the respective pixels on said thin film transistor substrate.

12. A liquid crystal display device having the liquid crystal panel as claimed in claim 9.

13. The liquid crystal display device as claimed in claim 12, which is located near the observer's side, is a color filter substrate.

14. The liquid crystal display device as claimed in claim 13, wherein the pitch at a horizontal direction of the respective pixels on said color filter substrate is smaller than or equal to the pitch at a horizontal direction of the respective pixels on said thin film transistor substrate.

* * * * *